United States Patent
Ralls, Jr.

(10) Patent No.: US 7,600,382 B2
(45) Date of Patent: Oct. 13, 2009

(54) TURBINE ENGINE WITH INTERSTAGE HEAT TRANSFER

(76) Inventor: Stephen Alden Ralls, Jr., 561 Grooms Rd., Clifton Park, NY (US) 12065

(*) Notice: Subject to any disclaimer, the term of this patent is extended or adjusted under 35 U.S.C. 154(b) by 247 days.

(21) Appl. No.: 11/336,330

(22) Filed: Jan. 20, 2006

(65) Prior Publication Data

US 2007/0017208 A1  Jan. 25, 2007

Related U.S. Application Data

(60) Provisional application No. 60/701,010, filed on Jul. 20, 2005.

(51) Int. Cl.
*F02C 7/16* (2006.01)
*F04D 29/58* (2006.01)
*F01D 9/02* (2006.01)

(52) U.S. Cl. ............ 60/730; 60/751; 60/806

(58) Field of Classification Search ............ 60/730, 60/772, 751, 806
See application file for complete search history.

(56) References Cited

U.S. PATENT DOCUMENTS

| | | | |
|---|---|---|---|
| 3,355,883 A * | 12/1967 | Beam, Jr. | 60/39.511 |
| 3,429,122 A * | 2/1969 | Pravda et al. | 60/39.281 |
| 3,621,908 A * | 11/1971 | Pravda | 60/39.511 |
| 3,730,644 A | 5/1973 | Jubb | |
| 3,999,377 A | 12/1976 | Oklejas et al. | |
| 4,186,559 A * | 2/1980 | Decker et al. | 60/531 |
| 4,720,968 A | 1/1988 | Knizia | |
| 5,082,050 A | 1/1992 | Darragh | |
| 5,249,921 A * | 10/1993 | Stueber et al. | 60/751 |
| 5,975,841 A * | 11/1999 | Lindemuth et al. | 415/114 |
| 6,510,684 B2 | 1/2003 | Matsunaga | |
| 6,722,119 B2 | 4/2004 | Boeck | |
| 2002/0124569 A1 | 9/2002 | Treece et al. | |
| 2003/0163993 A1 | 9/2003 | Douglas | |

FOREIGN PATENT DOCUMENTS

| | | | |
|---|---|---|---|
| JP | 62-170731 | * | 7/1987 |
| JP | 6-280797 | * | 10/1994 |
| JP | 11-117810 | * | 4/1999 |

OTHER PUBLICATIONS

Langston et al, Heat Pipe turbine Vane Cooling, Oct. 17-19, 1995, Advanced Turbine Systems Annual Program Review Conference., pp. 1-9.*

* cited by examiner

*Primary Examiner*—Ted Kim
(74) *Attorney, Agent, or Firm*—Preti Flaherty Beliveau & Pachios LLP

(57) ABSTRACT

Efficiency and/or power are increased in a turbine engine by using a self-contained, passive heat transfer device, such as a heat pipe, to transfer heat from working fluid in one section of the engine to working fluid in another section of the engine.

10 Claims, 6 Drawing Sheets

TURBINE ENGINE WITH INTERSTAGE HEAT TRANSFER

CROSS REFERENCES TO RELATED APPLICATIONS

This application claims the benefit of U.S. Provisional Application No. 60/701,010, filed Jul. 20, 2005.

BACKGROUND OF THE INVENTION

This invention relates generally to turbine engines, such as gas turbines and steam turbines, and more particularly to increasing the power density and/or efficiency of turbine engines.

Turbine engines have long been used for a variety of purposes, including power generation and aircraft and marine propulsion. Briefly, a gas turbine engine includes a compressor, which provides pressurized air to a combustor, wherein it is mixed with fuel and ignited for generating hot combustion gases. These gases are expanded in a turbine that extracts energy therefrom for powering the compressor and providing useful work. A steam turbine includes a turbine that is driven by the expansion of superheated steam, which is produced by a boiler or the like.

Various efforts have been used to enhance the efficiency and power output of these engines. For example, turbine reheat involves heating the gas or steam as it expands through the turbine to increase the turbine work output. The current practice for implementing reheat typically involves the injection of fuel, steam or any reheated working fluid at different stages. However, this practice requires use of generally massive and expensive auxiliary equipment such as valves, pumps, piping, etc.

Another technique for increasing efficiency in gas turbines is compressor intercooling, which involves cooling air between stages in the compressor at a constant pressure. This reduces the work needed to achieve compression because a cooler gas is more easily compressed. Like turbine reheat, compressor intercooling typically requires the addition of massive and expensive auxiliary equipment.

Accordingly, there is a need for a more compact and less expensive approach to increasing turbine engine power density and/or efficiency.

SUMMARY OF THE INVENTION

The above-mentioned need is met by the present invention, which provides a turbine engine that includes a self-contained, passive heat transfer device, such as a heat pipe, arranged to transfer heat from working fluid in one section of the engine to working fluid in another section of the engine. In one embodiment, heat is transferred from the turbine to the compressor discharge air. In another embodiment, heat is transferred from a heat source to the turbine. In a further embodiment, heat is transferred from a forward portion of the turbine to an aft portion of the turbine. In yet another embodiment, heat is transferred from the compressor to a heat sink. Another possible embodiment applies to a steam turbine in which heat is transferred from the boiling device to the turbine.

The present invention and its advantages over the prior art will be more readily understood upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
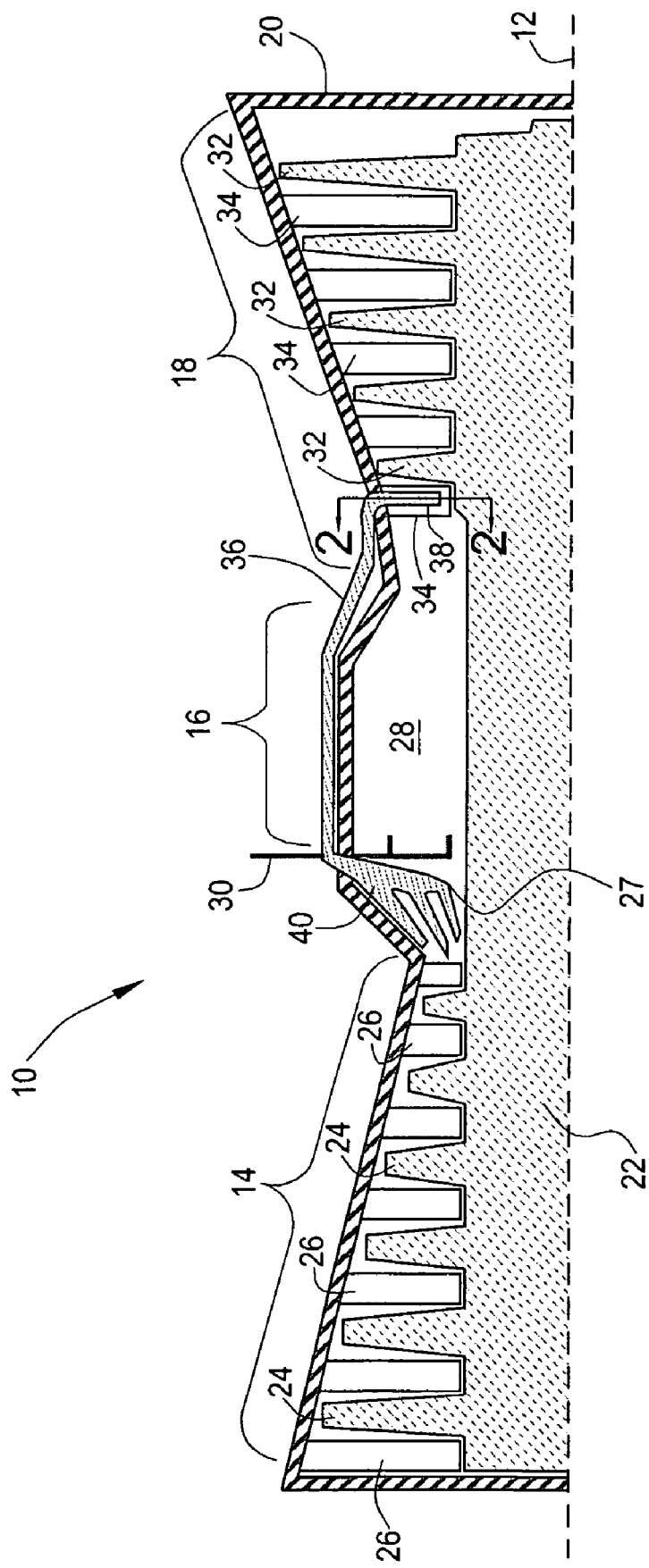
FIG. 1 is a sectional view of a gas turbine engine in accordance with a first embodiment of the invention.

The present invention generally relates to increasing efficiency and/or power output of turbine engines. As used herein, the term "turbine engine" includes gas turbines, steam turbines or any other device that utilizes a turbine. The term also includes systems that use one or more turbine engines, such as cogeneration or combined cycle power plants. Referring to the drawings wherein identical reference numerals denote the same elements throughout the various views, FIG. 1 illustrates a longitudinal cross-sectional view of a gas turbine engine 10. The engine 10 includes, in serial axial flow communication about a longitudinal centerline axis 12, a compressor 14, a heat source 16, and a turbine 18 enclosed by a casing 20. The turbine 18 is drivingly connected to the compressor 14 via a rotor shaft 22.

The compressor 14 is a multi-stage, axial compressor configured for pressurizing air as it flows downstream therethrough. Each stage includes a plurality of circumferentially spaced apart rotor blades 24 (only one per stage shown in FIG. 1) extending radially outwardly from the rotor shaft 22. A number of rows of circumferentially spaced apart stationary blades or stator vanes 26, which are fixed to the casing 20, are interleaved with the rows of compressor rotor blades 24. Thus, for each stage, the rotor blades 24 are located immediately downstream or aft of the stator vanes 26. In the illustrated embodiment, the compressor 14 has six stages. The first-stage stator vanes 26 function as inlet guide vanes that provide flow conditioning for the first-stage compressor rotor blades 24.

The compressor 14 provides compressed air to the heat source 16 via a diffuser 27, which is located immediately downstream of the compressor 14. The diffuser 27 conditions the compressor discharge air to be suitable for the heat source 16. As shown in FIG. 1, the heat source 16 is a combustor having a generally annular hollow body defining a combustion chamber 28 therein. (A possible alternative to the annular combustor shown in FIG. 1 is the so-called cannular combustor, which includes a plurality of combustor cans arranged annularly about the engine, wherein each can is connected to the compressor and exhausts combustion products to the turbine.) Fuel is introduced into the forward end of the combustor 16 by one or more fuel injectors 30 (only one shown in FIG. 1) and is mixed with the compressed air in any suitable fashion. The resulting fuel-air mixture is ignited and burned in the combustion chamber 28 for generating hot combustion gases. Most of the compressed air discharged from the compressor 14 passes into the combustor 16 to support combustion. However, a portion of the compressed air can be bled off and used to cool combustor liners and turbomachinery further downstream. As another alternative, the heat source 16 could be a heat exchanger that transfers heat from an external source, such as a waste heat, to the compressor discharge air.

The hot combustion gases are discharged to the turbine 18 located downstream of the heat source 16, where they are expanded so that energy is extracted. The turbine 18 is a multi-stage, axial turbine wherein each stage includes a plurality of circumferentially spaced apart rotor blades 32 (only one per stage shown in FIG. 1) extending radially outwardly from the rotor shaft 22. A number of rows of circumferentially spaced apart stationary blades or nozzles 34, which are fixed to the casing 20, are interleaved with the rows of rotor blades 32. Thus, for each stage, the turbine rotor blades 32 are located immediately downstream or aft of the turbine nozzles 34. The turbine 18, as shown by way of example in FIG. 1, has five stages. The expanding hot combustion gases cause the rotor shaft 22 to rotate, which drives the compressor 14 and produces usable work.

The gas turbine engine 10 further includes one or more heat transfer devices 36 positioned to transfer heat from one section of the engine 10 to a different and cooler section the of engine 10. Although only one such heat transfer device is shown in FIG. 1, it should be noted that more than one heat transfer device could be employed, with the plurality of devices preferably being equally spaced around the circumference of the engine 10.

One type of heat transfer device that can be employed is a heat pipe. A heat pipe generally comprises a sealed container containing a fluid at a pressure that allows the fluid to operate close to its liquid-gas phase change temperature. While various fluids including water can be used in the heat pipe, preferred fluids include liquid metals such as cesium, rubidium, potassium, sodium and mercury. One end of the container defines a cold side or condensing section and the other end defines a hot side or evaporative section. The heat pipe includes an internal capillary device, such as a wick, to draw condensed fluid from the cold side to the hot side. In the hot side of the heat pipe, the fluid absorbs heat from the surrounding environment until enough heat is absorbed to change the phase of the fluid from liquid to gas. Then the pressure differential caused by the temperature difference causes the gas to travel to the cold side where heat is removed and the fluid returns to the liquid phase, where it is again drawn to the hot side by the capillary device. The heat pipe thus uses the phase change of the fluid to remove heat from the hot evaporative section and deposit heat in the cooler location. The heat pipe is a self-contained device in that it uses its internal operating fluid, and not working fluid from the turbine engine, to transfer heat. The heat pipe is also a passive device, as its operation relies on the temperature difference and does not require any additional work input, such as an external pump.

In the illustrated embodiment, the heat transfer device 36 is a heat pipe having a hot side or evaporative section 38 positioned to be in thermal communication with the hot combustion gases in the turbine 18 and a cold side or condensing section 40 positioned to be in thermal communication with the compressed air discharged from the compressor 14. For instance, the evaporative section 38 is in thermal communication with one of the forward-most or first-stage turbine nozzles 34, and the condensing section 40 is in thermal communication with the diffuser 27. While the evaporative section 38 is shown as being in thermal communication with a first-stage turbine nozzle, it should be noted that the evaporative section 38 could alternatively be in thermal communication with a latter-stage turbine nozzle. However, because the first-stage turbine nozzles are typically the hottest, and the closest to the diffuser 27, it is generally more effective to use a first-stage turbine nozzle. Also, the evaporative section 38 could be in thermal contact with an exterior surface of the turbine nozzle, or the evaporative section 38 could be incorporated into the structure of the turbine nozzle, essentially making the turbine nozzle the evaporative section. Furthermore, the evaporative section 38 need not necessarily be in physical contact with the nozzle structure. The evaporative section 38 could be positioned anywhere, such as between adjacent turbine nozzles, so that it is in thermal communication with the hot gases discharged from the heat source 16. Similarly, the condensing section 40 can be positioned within the flow in the diffuser 27, positioned in physical contact with a wall or walls of the diffuser 27, or incorporated into a wall or walls of the diffuser 27.

Figure 2:
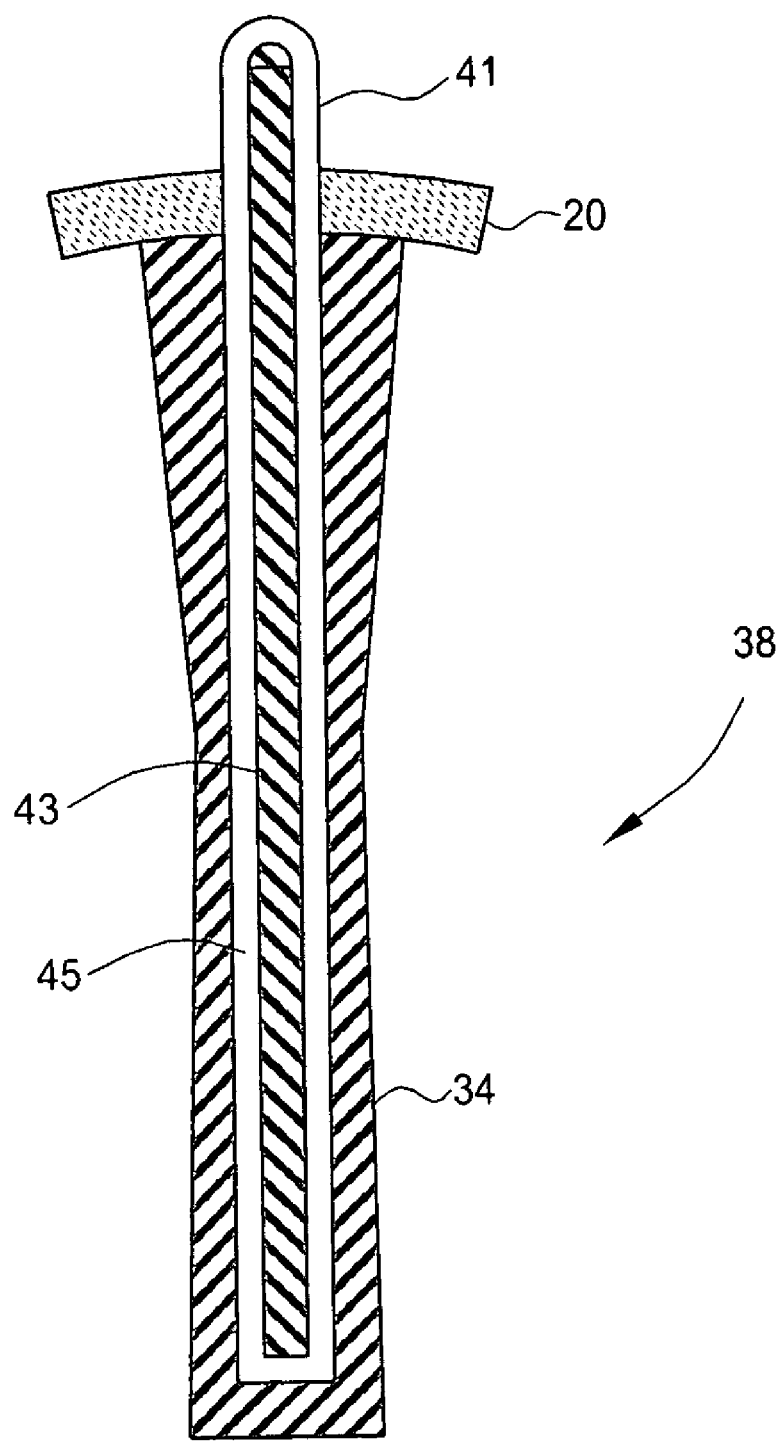
FIG. 2 is a fragmentary, sectional view taken along line 2-2 of FIG. 1.

For example, FIG. 2 shows one configuration in which the evaporative section 38 is incorporated into the structure of a turbine nozzle 34. The portion of the heat pipe container 41 that makes up the evaporative section 38 extends into the interior of the turbine nozzle 34 and is encased by the nozzle walls. A capillary device 43, such as a wick, is disposed in the center of the heat pipe container to draw condensed fluid from the condensing section 40 to the evaporative section 38. A gap 45 between the internal surface of the container 41 and the capillary device 43 defines a volume through which vapor can travel back to the condensing section 40. The heat pipe container 41 is preferably made of a material having high thermal conductivity so that heat will be efficiently transferred from the hot combustion gases, to the turbine nozzle walls, to the heat pipe container and to the heat pipe fluid.

As shown in FIG. 1, the heat pipe 36 penetrates the casing 20 near its two ends so that the intermediate section between the evaporative section 38 and the condensing section 40 is located outside of the casing 20. Alternatively, the intermediate section could be attached to, or embedded in, the casing wall.

As mentioned above, more than one heat transfer device can be employed. For instance, there could be enough heat pipes so that each one of the first-stage turbine nozzles was in thermal communication with a respective evaporative section. Alternatively, the number of heat pipes could be such that only some portion of the turbine nozzles in the selected stage would be in thermal communication with a respective evaporative section, such as every other turbine nozzle or every third turbine nozzle.

The heat pipe 36 transfers heat from the hot combustion gases in the turbine 18 to the cooler compressed air being discharged from the compressor 14. Therefore, the enthalpy of the working fluid (the hot combustion gases) in the turbine 18 is decreased, and the enthalpy of the working fluid (the compressed air) in the cooler area forward of the combustion chamber 28 is increased. Engine efficiency is thus increased because the increased compressed air temperature results in higher firing temperatures. That is, because the compressed air discharged from the compressor 14 is "preheated," the temperature of the combustion products will be greater for a given amount of fuel. Another way to look at it is that less fuel is required to raise the temperature of the hot combustion products entering the turbine 18 to the desired level. Furthermore, removing heat from the turbine nozzles 34 reduces the cooling load needed for the turbine structure, thereby further increasing engine efficiency and/or power density.

Figure 3:
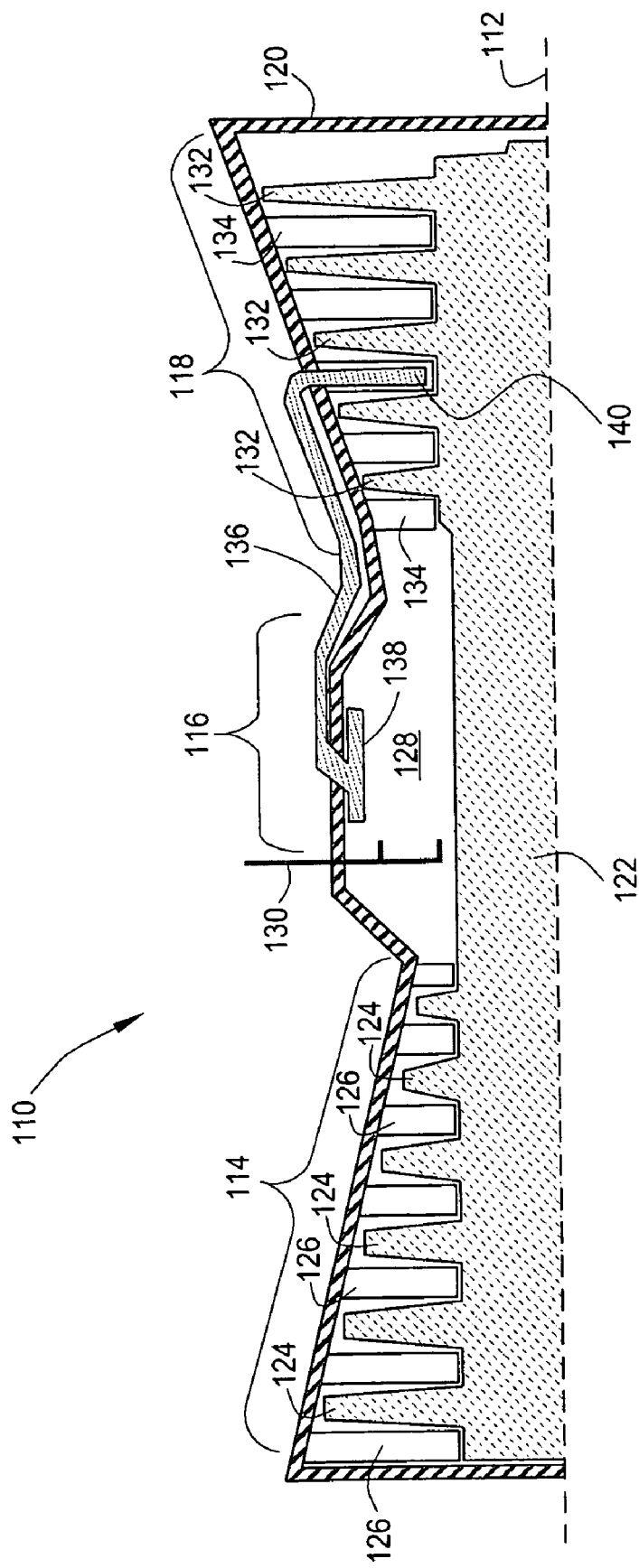
FIG. 3 is a sectional view of a gas turbine engine in accordance with a second embodiment of the invention.

Referring to FIG. 3, a gas turbine engine 110 in accordance with a second embodiment of the present invention is shown. Like the engine of the first described embodiment, the engine 110 includes, in serial axial flow communication about a longitudinal centerline axis 112, a compressor 114, a heat source 116, and a turbine 118 enclosed by a casing 120. The turbine 118 is drivingly connected to the compressor 114 via a rotor shaft 122. The compressor 114 is a multi-stage axial compressor having interleaved rows of rotor blades 124 and stationary blades or stator vanes 126 (only one of each shown per stage). The turbine 118 is a multi-stage turbine having interleaved rows of rotor blades 132 and stationary blades or nozzles 134 (only one of each shown per stage).

In operation, the compressor 114 provides compressed air to the heat source 116, typically via a diffuser (not shown in FIG. 3). In the illustrated embodiment, the heat source 116 is a combustor having a generally annular hollow body defining a combustion chamber 128 therein. Fuel is introduced into the forward end of the combustor 116 by one or more fuel injectors 130 (only one shown in FIG. 3) and is mixed with the compressed air in any suitable fashion. The resulting fuel-air mixture is ignited and burned in the combustion chamber 128 for generating hot combustion gases. The hot combustion gases are discharged to the turbine 118 located downstream of the combustor 116, where they are expanded to drive the turbine 118 so that energy can be extracted.

Similarly to the previously described embodiment, the gas turbine engine 110 includes one or more heat transfer devices 136 positioned to transfer heat from one section of the engine 110 to a different and cooler section the of engine 110. Although only one such heat transfer device is shown in FIG. 3, it should be noted that more than one heat transfer device could be employed, with the plurality of devices preferably being equally spaced around the circumference of the engine 110.

In this second embodiment, the heat transfer device 136 is a heat pipe having a hot side or evaporative section 138 positioned to be in thermal communication with the hot combustion gases in the heat source 116 and a cold side or condensing section 140 positioned to be in thermal communication with the combustion gases in the turbine 118. Generally, the condensing section 140 is located in the downstream portion of the turbine 118 where the expanding combustion gases are appreciably cooler than the gases in the heat source 116. Specifically, the condensing section 140 is shown to be in thermal communication with the one of the fourth-stage turbine nozzles 134, although it should be noted that the condensing section 140 could alternatively be in thermal communication with a turbine nozzle in one of the other turbine stages. However, because the temperature difference between the earlier stages of the turbine 118 and the heat source 116 is typically not large, it is generally preferred to use one of the latter-stage turbine nozzles, which has a more significant temperature differential with the heat source 116. Also, the condensing section 140 could be in thermal contact with an exterior surface of the turbine nozzle, or the condensing section 140 could be incorporated into the structure of the turbine nozzle, essentially making the turbine nozzle the condensing section.

The evaporative section 138 of the heat pipe 136 can be suspended in the combustion chamber 128 so as to be positioned away from the combustor walls. Alternatively, evaporative section 138 could be mounted to (as shown in FIG. 3), or even incorporated into, the combustor wall.

As mentioned above, more than one heat transfer device can be employed. For instance, there could be enough heat pipes so that each turbine nozzle of the selected stage is in thermal communication with a respective condensing section. Alternatively, the number of heat pipes could be such that only some portion of the turbine nozzles in the selected stage would be in thermal communication with a respective condensing section, such as every other turbine nozzle or every third turbine nozzle.

The heat pipe 136 transfers heat from the hot combustion gases in the heat source 116 to the cooler combustion gases in the downstream portion of the turbine 118, thereby "reheating" the combustion gases. Therefore, the enthalpy of the working fluid (the hot combustion gases) in the heat source 116 is decreased, and the enthalpy of the working fluid (the cooler combustion gases) being expanded in the downstream portion of the turbine 118 is increased. This use of reheat increases the work output of the engine 110 (compared to a simple cycle not using reheat) without increasing fuel input or work input to the compressor, thereby making the engine 110 more efficient and/or power dense.

Figure 4:
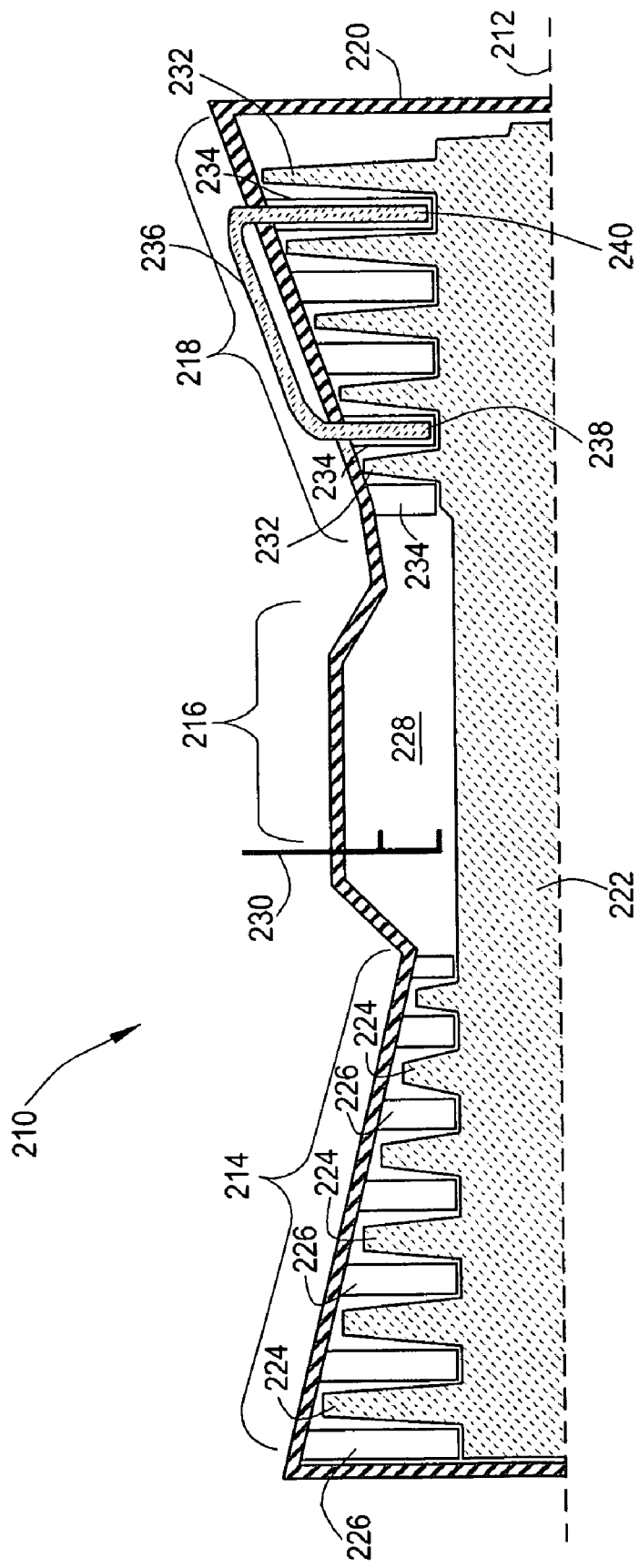
FIG. 4 is a sectional view of a gas turbine engine in accordance with a third embodiment of the invention.

Turning to FIG. 4, a gas turbine engine 210 in accordance with a third embodiment of the present invention is shown. Like the engines of the prior embodiments, the engine 210 includes, in serial axial flow communication about a longitudinal centerline axis 212, a compressor 214, a heat source 216, and a turbine 218 enclosed by a casing 220. The turbine 218 is drivingly connected to the compressor 214 via a rotor shaft 222. The compressor 214 is a multi-stage axial compressor having interleaved rows of rotor blades 224 and stationary blades or stator vanes 226 (only one of each shown per stage). The turbine 218 is a multi-stage turbine having interleaved rows of rotor blades 232 and stationary blades or nozzles 234 (only one of each shown per stage).

In operation, the compressor 214 provides compressed air to the heat source 216, typically via a diffuser (not shown in FIG. 4). In the illustrated embodiment, the heat source 216 is a combustor having a generally annular hollow body defining a combustion chamber 228 therein. Fuel is introduced into the forward end of the combustor 216 by one or more fuel injectors 230 (only one shown in FIG. 4) and is mixed with the compressed air in any suitable fashion. The resulting fuel-air mixture is ignited and burned in the combustion chamber 228 for generating hot combustion gases. The hot combustion gases are discharged to the turbine 218 located downstream of the combustor 216, where they are expanded to drive the turbine 218 so that energy can be extracted.

Similarly to the previously described embodiments, the gas turbine engine 210 includes one or more heat transfer devices 236 positioned to transfer heat from one section of the engine 210 to a different and cooler section the of engine 210. Although only one such heat transfer device is shown in FIG. 4, it should be noted that more than one heat transfer device could be employed, with the plurality of devices preferably being equally spaced around the circumference of the engine 210.

In this embodiment, the heat transfer device 236 is a heat pipe having a hot side or evaporative section 238 positioned to be in thermal communication with the hot combustion gases in the forward or upstream portion of portion of the turbine 218 and a cold side or condensing section 240 positioned to be in thermal communication with the combustion gases in the aft or downstream portion of the turbine 218. The expanding combustion gases are appreciably cooler in the aft portion of the turbine 218. The evaporative section 238 is in thermal communication with one of the turbine nozzles 234 of a forward stage, such as the second stage, as shown in FIG. 4, and the condensing section 240 is in thermal communication with the one of the turbine nozzles 234 of an aft stage, such as the aft-most or fifth stage as shown in FIG. 4. The greatest temperature differential is realized by using the forward-most and aft-most stages, but it should be noted that turbine nozzles in other stages could also be used. Also, the evaporative section 238 and the condensing section 240 could be in thermal contact with an exterior surface of the respective turbine nozzles, or alternatively could be incorporated into the structure of the respective turbine nozzles.

As mentioned above, more than one heat transfer device can be employed. For instance, there could be enough heat pipes so that each turbine nozzle of the selected stages is in thermal communication with a respective evaporative or condensing section, as the case may be. Alternatively, the number of heat pipes could be such that only some portion of the turbine nozzles in the selected stages would be in thermal communication with a respective evaporative or condensing section, such as every other turbine nozzle or every third turbine nozzle.

The heat pipe 236 transfers heat from the hot combustion gases in the forward portion of the turbine 218 to the cooler combustion gases in the aft portion of the turbine 218, thereby "reheating" the downstream combustion gases. Therefore, the enthalpy of the working fluid (the hot combustion gases) in the forward portion of the turbine 218 is decreased, and the enthalpy of the working fluid (the cooler combustion gases) being expanded in the aft portion of the turbine 218 is increased. This use of reheat increases the work output of the engine 210 (compared to a simple cycle not using reheat) without increasing fuel input or work input to the compressor, thereby making the engine 210 more efficient.

Figure 5:
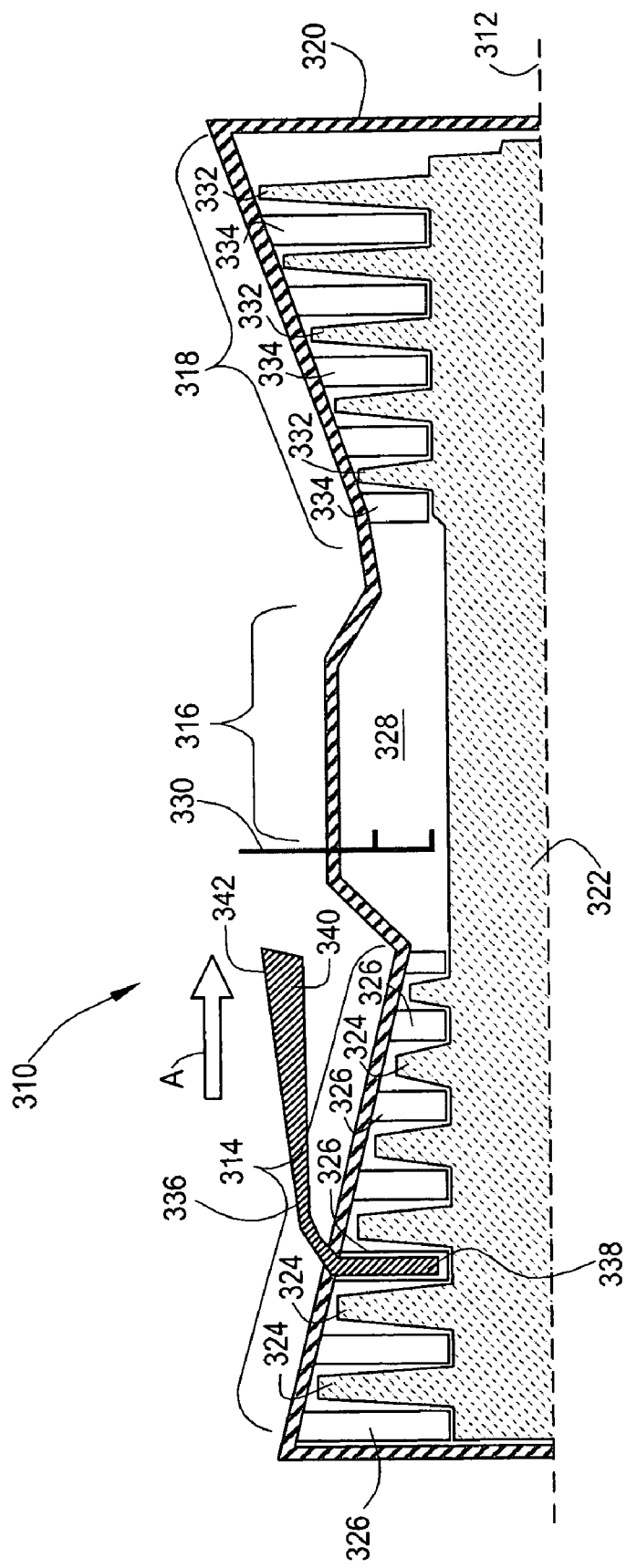
FIG. 5 is a sectional view of a gas turbine engine in accordance with a fourth embodiment of the invention.

Referring to FIG. 5, a gas turbine engine 310 in accordance with a fourth embodiment of the present invention is shown. Like the engines of the prior embodiments, the engine 310 includes, in serial axial flow communication about a longitudinal centerline axis 312, a compressor 314, a heat source 316, and a turbine 318 enclosed by a casing 320. The turbine 318 is drivingly connected to the compressor 314 via a rotor shaft 322. The compressor 314 is a multi-stage axial compressor having interleaved rows of rotor blades 324 and stationary blades or stator vanes 326 (only one of each shown per stage). The turbine 318 is a multi-stage turbine having interleaved rows of rotor blades 332 and stationary blades or nozzles 334 (only one of each shown per stage).

In operation, the compressor 314 provides compressed air to the heat source 316, typically via a diffuser (not shown in FIG. 5). In the illustrated embodiment, the heat source 316 is a combustor having a generally annular hollow body defining a combustion chamber 328 therein. Fuel is introduced into the forward end of the combustor 316 by one or more fuel injectors 330 (only one shown in FIG. 5) and is mixed with the compressed air in any suitable fashion. The resulting fuel-air mixture is ignited and burned in the combustion chamber 328 for generating hot combustion gases. The hot combustion gases are discharged to the turbine 318 located downstream of the combustor 316, where they are expanded to drive the turbine 318 so that energy can be extracted.

Similarly to the previously described embodiments, the gas turbine engine 310 includes one or more heat transfer devices 336 positioned to transfer heat from one section of the engine 310 to a different and cooler section the of engine 310. Although only one such heat transfer device is shown in FIG. 5, it should be noted that more than one heat transfer device could be employed, with the plurality of devices preferably being equally spaced around the circumference of the engine 310.

In this embodiment, the heat transfer device 336 is a heat pipe having a hot side or evaporative section 338 positioned to be in thermal communication with the air flow in the compressor 314 and a cold side or condensing section 340 positioned to be in thermal communication with a cooler working fluid that functions as a heat sink. Specifically, the evaporative section 338 is in thermal communication with the one of the compressor stator vanes 326. While the evaporative section 338 can be in thermal communication with any of the compressor stator vane 326, it is preferably in thermal communication with a mid-stage compressor stator vane, such as a fourth-stage compressor stator vane 326 as shown in FIG. 5. Because the compressor air is approximately halfway to the full pressurization in the mid-stages, placing the evaporative section 338 in thermal communication with a mid-stage compressor stator vane is generally more effective in providing the intercooling effect described in more detail below. Furthermore, the evaporative section 338 could be in thermal contact with an exterior surface of the compressor stator vane 326, or the evaporative section 338 could be incorporated into the structure of the compressor stator vane, essentially making the compressor stator vane the evaporative section.

In the illustrated embodiment, the condensing section 340 is in thermal communication with a bypass airflow (represented by arrow A) located outside of the casing 320. For example, one type of gas turbine engine commonly used for aircraft propulsion is the bypass turbofan engine. A bypass turbofan engine includes a fan (not shown) located forward of the compressor 314 and driven by the turbine via a dual shaft arrangement. The air exiting the fan is split so that a portion of the air flows into the compressor 314 and the rest of the air (i.e., the bypass airflow A) bypasses the engine core outside of the casing 320. The bypass airflow A flows through a duct defined between the casing 320 and a nacelle (not shown) and provides most of the engine thrust. While FIG. 5 shows using the bypass airflow as a heat sink, it should be noted that other fluid flows in or about the engine 310 could be used as a heat sink.

The condensing section 340 is located in the bypass airflow A so that heat from the condensing section 340 is transferred to the relatively cool bypass airflow. The condensing section 340 can be configured with external fins 342 to facilitate the heat transfer.

As mentioned above, more than one heat transfer device can be employed. For instance, there could be enough heat pipes so that each compressor stator vane of the selected stage is in thermal communication with a respective evaporative section. Alternatively, the number of heat pipes could be such that only some portion of the compressor stator vanes in the selected stage would be in thermal communication with a respective evaporative section, such as every other compressor stator vane or every third compressor stator vane.

The heat pipe 336 transfers heat from the air flow in the compressor 314 to the bypass airflow, thereby providing "intercooling" to the compressor 314. Therefore, the enthalpy of the working fluid (the air flow) in the compressor 314 is decreased, and the enthalpy of the working fluid (the bypass flow) of the heat sink is increased. This use of intercooling decreases the amount of work input to the compressor 314 (compared to a simple cycle not using intercooling) needed to achieve a given pressure ratio. This results in a net increase in the work output of the engine 310, which increases the overall efficiency of the engine 310.

Figure 6:
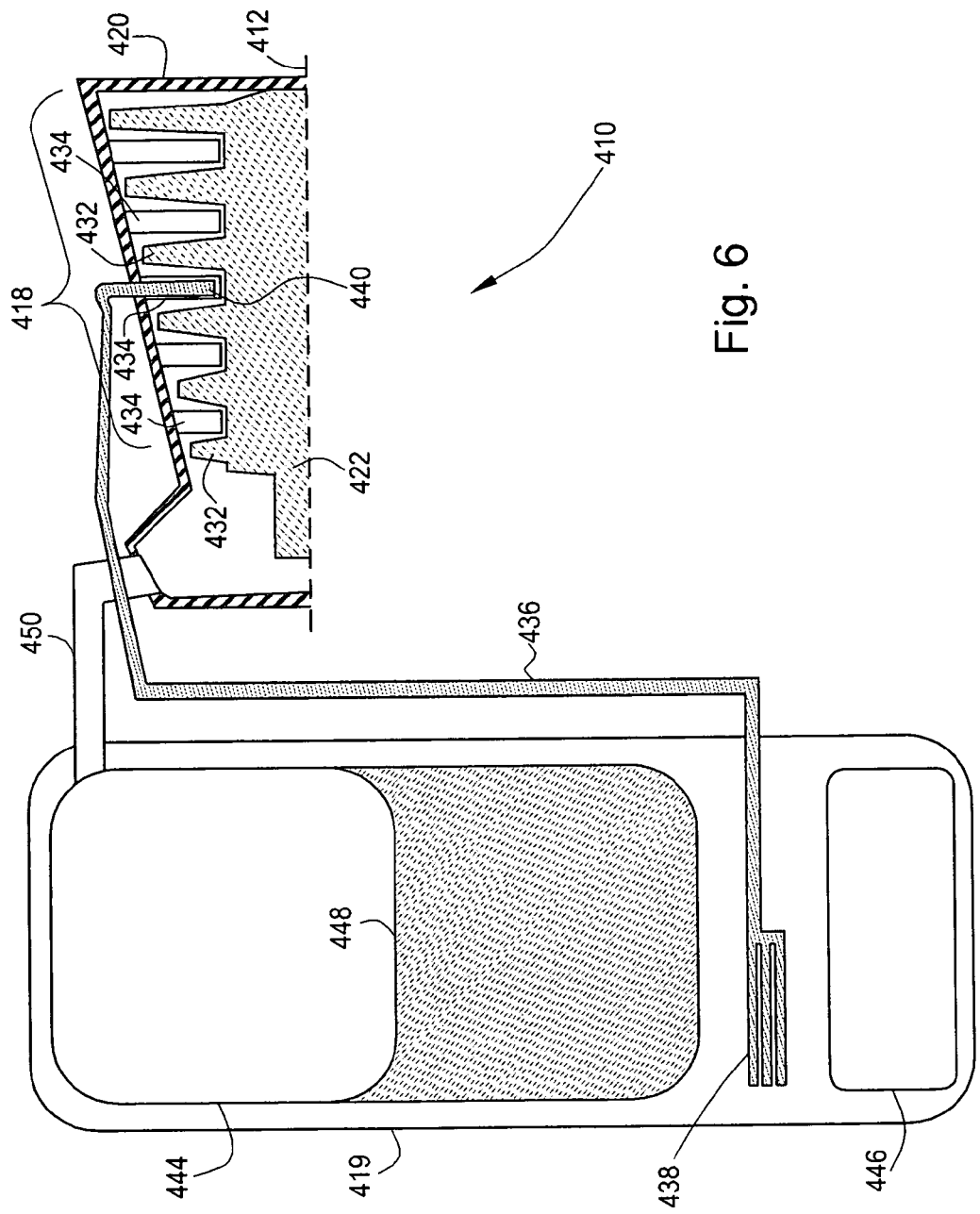
FIG. 6 is a sectional view of a steam turbine engine in accordance with a fifth embodiment of the invention.

Referring to FIG. 6, a steam turbine engine 410 in accordance with a fifth embodiment of the present invention is shown. The steam engine includes a multi-stage turbine 418 and a boiling device 419 comprising a boiler 444 and a heat source 446. The turbine 418 includes interleaved rows of circumferentially spaced rotor blades 432 and circumferentially spaced stationary blades or nozzles 434 enclosed by a casing 420. The rotor blades 432 extend radially outwardly from a rotor shaft 422, and the nozzles 434 are fixed to the casing 420 (only one of each shown per stage). The rotor shaft 422 is mounted to rotate about a longitudinal centerline axis 412.

The heat source 446 heats water 448 in the boiler 444 to produce high-pressure, superheated steam that is supplied to the forward end of the turbine 418 via a conduit 450. The superheated steam is expanded in the turbine 418 to drive the turbine 418 and the rotor shaft 422 so that work can be produced. The heat source 446 could be a burner, hot exhaust products from a gas turbine engine, or other waste heat sources, thereby enabling this embodiment to be used in conjunction with cogeneration or combined cycle plants.

The steam turbine engine 410 includes one or more heat transfer devices 436 positioned to transfer heat from one section of the engine 410 to a different and cooler section the of engine 410. Although only one such heat transfer device is shown in FIG. 6, it should be noted that more than one heat transfer device could be employed.

In the illustrated embodiment, the heat transfer device 436 is a heat pipe having a hot side or evaporative section 438 positioned to be in thermal communication with the hot gas from the heat source 446 that is heating the boiler 444 and a cold side or condensing section 440 positioned to be in thermal communication with the expanding vapor in the turbine 418. As an alternative, the evaporative section 438 positioned to be in thermal communication with the superheated steam in the boiler 444 or the conduit 450. Generally, the condensing section 440 is located in the downstream or aft portion of the turbine 418 where the vapor is appreciably cooler than the heat source gas. Specifically, the condensing section 440 is shown to be in thermal communication with the one of the fourth-stage turbine nozzles 434, although it should be noted that the condensing section 440 could alternatively be in thermal communication with a turbine nozzle in one of the other turbine stages. However, it is generally preferred to use one of the latter-stage turbine nozzles because the temperature difference between the latter stages of the turbine 418 and the heat source 446 will be greater. Also, the condensing section 440 could be in thermal contact with an exterior surface of the turbine nozzle, or the condensing section 440 could be incorporated into the structure of the turbine nozzle, essentially making the turbine nozzle the condensing section.

As mentioned above, more than one heat transfer device can be employed. For instance, there could be enough heat pipes so that each turbine nozzle of the selected stage is in thermal communication with a respective condensing section. Alternatively, the number of heat pipes could be such that only some portion of the turbine nozzles in the selected stage would be in thermal communication with a respective condensing section, such as every other turbine nozzle or every third turbine nozzle.

The heat pipe 436 transfers heat from the hot gas of the heat source 446 to the expanding vapor in the aft portion of the turbine 418, thereby "reheating" the vapor. Therefore, the enthalpy of the working fluid (the hot gas) from the heat source 446 is decreased, and the enthalpy of the working fluid (the vapor) in the aft portion of the turbine 418 is increased. This use of reheat increases the work output of the engine 410 (compared to a simple cycle not using reheat) without increasing fuel input or work input to the compressor, thereby making the engine 410 more efficient.

Although all of the illustrated embodiments describe a heat pipe for the heat transfer device, it should be noted that other types of heat transfer devices could be employed. For example, the heat transfer device may also comprise a material that has a very high thermal conductivity, such as solid crystal diamond, formed into a high thermal conductivity conduit. Such a high thermal conductivity conduit would be a self-contained, passive heat transfer device because it does not utilize the turbine engine's working fluid or an additional work input to transfer heat. Another alternative is to use a self-contained device that utilizes internal nanopumps for an internal heat transfer circuit.

While specific embodiments of the present invention have been described, it will be apparent to those skilled in the art that various modifications thereto can be made without departing from the spirit and scope of the invention as defined in the appended claims.

What is claimed is:

1. A turbine engine comprising:
   a turbine having at least one stage of turbine nozzles;
   a compressor;
   a casing enclosing said turbine and said compressor;
      a diffuser structure located inside of said casing and downstream of said compressor; and
      a heat pipe comprising a self-contained, passive heat transfer device having a first section and a second section, wherein said first section is incorporated into one of said turbine nozzles and wherein said second section is in thermal communication with and incorporated into walls of said diffuser structure, whereby heat is transferred from said turbine nozzle to said diffuser structure.

2. The turbine engine of claim 1 wherein said second section is positioned within said diffuser structure.

3. The turbine engine of claim 1 wherein said heat transfer device has a section intermediate said first section and said second section that is located outside of said casing.

4. The turbine engine of claim 1 wherein said turbine is an axial turbine having multiple stages of turbine nozzles.

5. The turbine engine of claim 4 wherein said first section is incorporated into a forward stage turbine nozzle.

6. The turbine engine of claim 1 further comprising one or more additional heat transfer devices, each additional heat transfer device having a first section and a second section, wherein said first section is incorporated into one of said turbine nozzles and wherein said second section is in thermal communication with said diffuser structure, whereby heat is transferred from said turbine nozzle to said diffuser structure.

7. A turbine engine comprising:
   a turbine having at least one stage of turbine nozzles;
   a compressor;
   a diffuser located downstream of said compressor; and
   a heat pipe having a condensing section and an evaporative section, wherein said evaporative section is incorporated into one of said turbine nozzles and wherein said condensing section is structurally defined by walls of said diffuser.

8. The turbine engine of claim 7 wherein said turbine is an axial turbine having multiple stages of turbine nozzles.

9. The turbine engine of claim 8 wherein said evaporative section is incorporated into a forward stage turbine nozzle.

10. The turbine engine of claim 7 further comprising one or more additional heat pipes, each additional heat pipe having a condensing section and an evaporative section, wherein said evaporative section is incorporated into one of said turbine nozzles and wherein said condensing section is structurally defined by said diffuser.

* * * * *